Feb. 26, 1929.
C. R. BAKER
1,703,332
MOTOR OIL CHANGE INDICATOR
Filed Aug. 13, 1926
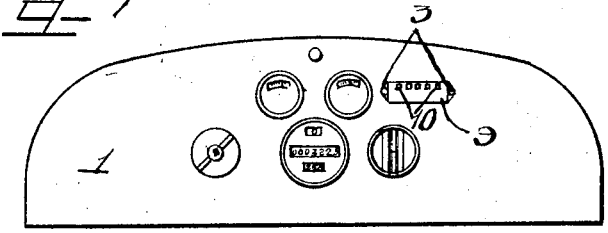
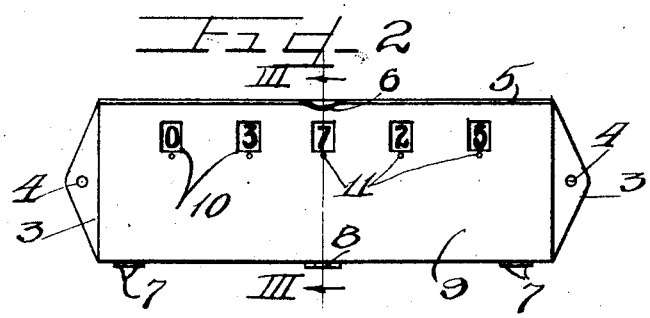
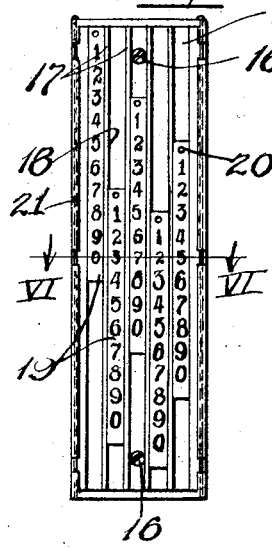
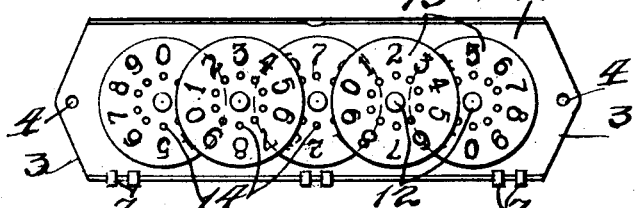
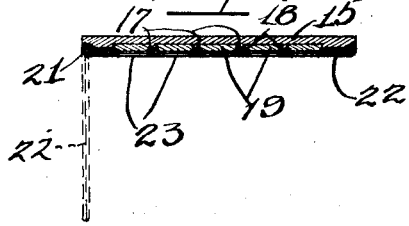
Inventor
Charles R. Baker.
by Charles N. Hills
Attys.

Patented Feb. 26, 1929.

1,703,332

UNITED STATES PATENT OFFICE.

CHARLES R. BAKER, OF EVANSTON, ILLINOIS.

MOTOR-OIL-CHANGE INDICATOR.

Application filed August 13, 1926. Serial No. 128,925.

In using an automobile it has been found highly desirable to change the lubricating oil for the engine after every 500 miles, making it necessary for the driver of the automobile to remember the mileage when the last change of oil was made. This has led to confusion thereby making it necessary for the driver to guess the mileage.

This invention relates to an improved motor oil change indicator adapted to be conveniently secured on the instrument board of a vehicle and adapted to be set when the oil is changed to indicate the mileage at which the next change of motor oil is to be made.
It is an object of this invention to provide an adjustable motor oil change indicator adapted to be conveniently mounted in an automobile to indicate the mileage at which the next change of motor oil is to be made.
It is also an object of this invention to provide a motor oil change indicator adapted to be mounted in a convenient place on an automobile instrument panel and having a plurality of adjustable numeral scales associated with each other to permit the same to be set to indicate through suitable sight apertures the particular mileage at which the next change in motor oil is to be made.

It is an important object of this invention to provide a motor oil change indicator adapted for mounting on the instrument panel of an automobile and having numeral indicators adapted to be adjusted and then locked in their adjusted positions by a cover mechanism having apertures through which the mileage figures for the next change of motor oil may be clearly observed.

Other and further important objects of this invention will be apparent from the disclosures in the specification and the accompanying drawings.

This invention (in a preferred form) is illustrated in the drawings and hereinafter more fully described.
In the drawings:

Figure 1 is an elevational view of an automobile instrument panel having a motor oil change indicator involving the principles of this invention mounted thereon.
Figure 2 is an enlarged front elevation of the indicator in closed position.

Figure 3 is an enlarged transverse section of the device taken on line III—III of Figure 2, showing a fragmentary portion of the cover in dotted lines when in open position.

Figure 4 is an interior elevation of the indicator with the cover removed.

Figure 5 is an interior elevation of a modified form of motor oil change indicator with the cover removed.

Figure 6 is an enlarged transverse section taken on line VI—VI of Figure 5, showing the open position of the cover in dotted lines.

As shown on the drawings:

The reference numeral 1 indicates the instrument panel of an automobile having mounted thereon in a convenient position, a motor oil change indicator embodying the principles of this invention. The motor oil change indicator comprises a back or mounting plate 2, provided with integral end extensions 3 each having an aperture 4 therein to receive retaining screws for the purpose of mounting the indicator in position on the instrument panel 1, or in any other desired convenient position in the automobile or vehicle in which it may be desirable to use a motor oil change indicator. Integrally formed along the upper longitudinal edge of the mounting plate 2 is a forwardly directed flange 5 having a spring latch 6 formed at the middle portion of the front edge thereof. Provided on the lower margin of the mounting plate 2 are a plurality of pairs of hinged members 7 with which hinge sleeves 8 are adapted to interfit. The hinge sleeves 8 are formed on the lower margin of a cover or front plate 9 having a row of spaced sight apertures 10 formed in a longitudinal row near the upper margin of the cover plate. Secured to the cover plate are a plurality of inwardly directed locking pins or studs 11. The pins are arranged in a longitudinal row with a pin associated with each of the sight apertures 10 as indicated in Figure 2.

Rotatably mounted on studs 12 on the mounting plate 2 are a plurality of circular scales or dials 13 each of which has painted, stamped, or engraved or otherwise affixed thereon a series of numerals reading from 0 to 9. Each of the indicating dials or scales 13 is provided with a ring of apertures 14 with which the locking pins 11 are adapted to coact when the cover 9 is closed to hold the indicating dials locked in a predetermined set position, so that the uppermost numerals of the respective dials are positioned to be directly observed through the sight apertures 10 of the cover plate 9 as illustrated in Figure 2. The numerals observed through the sight apertures are intended to indicate the last five figures of the mileage reading of the vehicle upon which the instrument is to be used, and at which mileage the motor oil of the vehicle is to be changed. The cover plate 9 when moved into closed position, is adapted to snap under the spring latch 6 to hold the cover locked in position. It will of course be understood that any other desired type of locking mechanism may be provided for holding the cover 9 in its closed position so that the indicating dials of the device can not be accidentally moved out of their set positions or be tampered with by unauthorized individuals.

Figures 5 and 6 illustrate a modified form of motor oil change indicator comprising a mounting plate 15 having apertures therein for the purpose of receiving mounting screws 16 adapted to hold the instrument in a set position on the instrument board of an automobile or in any other desired position within the vehicle. Mounted on the front face of the mounting plate 15 are a plurality of dovetail ribs 17 forming a plurality of dovetail guide grooves 18 in which indicating scales 19 are slidably mounted. Each of the indicating scales has stamped, painted, or otherwise affixed thereto a row of numerals ranging from 0 to 9. Each of the indicating scales is also provided with an aperture 20 at one end thereof to permit a pointed object to be inserted therein to facilitate slidable adjustment of the scale. Provided along one longitudinal margin of the mounting plate 15 is a hinge mechanism 21 for pivotally supporting a cover plate 22 in position. The cover plate 22 is provided with a plurality of sight apertures 23 positioned in a transverse row across the middle portion of the cover 22 as indicated in Figure 6. When the cover plate 22 is moved into the open dotted line position in Figure 6 the scales 19 are adapted to be slidably moved into different positions so that the transverse row of figures in the middle portion of the instrument will indicate the last five figures of the mileage at which the motor oil is to be changed. When the cover is closed after adjustment of the scales 19 the middle row of figures are adapted to be clearly observed through the sight apertures 23 of the cover plate. Any desired locking or latching means for the cover plate 22 may be provided. When the cover plate 22 is moved into closed position it acts as a locking means for holding the slidable scales 19 locked by pressure in their set positions of adjustment.

The two forms of motor oil change indicators described and illustrated are of simple and inexpensive construction and may be readily mounted in place on the instrument board of an automobile or in any other desired convenient position within the vehicle by an inexperienced person. The covers may be unlocked and easily opened to permit adjustment of the indicating discs or slides so that a predetermined mileage figure may be easily obtained and clearly read through the sight apertures in the cover plates when the same are moved into closed position. In the form of the device illustrated in Figures 1 and 4 the indicating dials are adapted to be locked in their set positions by means of the respective pins 11 coacting with the respective apertures 14 in the dials so that there will be no liability of having the indicating dials accidentally move out of their set positions.

In the modified form of the device shown in Figures 5 and 6 the slidable indicating scales 19 are adapted to be held in their set positions by means of the cover 22, which when in closed position acts to press against the scales to hold the same against accidental sliding. The covers may be held in closed position by spring latching means or by any other desired type of lock, either key operated or otherwise.

I am aware that many changes may be made, and numerous details of construction may be varied through a wide range without departing from the principles of this invention, and I therefore do not purpose limiting the patent granted hereon, otherwise than necessitated by the scope of the appended claim.

I claim as my invention:

In a device of the class described, a mounting plate, said plate having a forwardly directed flange extending along only the upper longitudinal edge thereof, and having longitudinally extending apertured ends projecting beyond the flange, means engaged through said apertured ends for securing the plate in position, a plurality of numeral-bearing disks rotatably mounted on said plate, a cover hinged on the lower margin of said plate, said cover being shorter than the said plate and having sight apertures through which selected numerals may be observed, means on the said flange to secure the said cover in its closed position.

In testimony whereof I have hereunto subscribed my name.

CHARLES R. BAKER.